(12) United States Patent
Miura

(10) Patent No.: US 10,059,070 B2
(45) Date of Patent: Aug. 28, 2018

(54) TIRE, TREAD FOR RETREAD TIRE, METHOD FOR MANUFACTURING THE TREAD FOR RETREAD TIRE, RETREAD TIRE HAVING THE TREAD FOR RETREAD TIRE, AND METHOD FOR MANUFACTURING THE RETREAD TIRE

(75) Inventor: Takahiro Miura, Tachikawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 715 days.

(21) Appl. No.: 13/985,932

(22) PCT Filed: Feb. 24, 2012

(86) PCT No.: PCT/JP2012/001307
§ 371 (c)(1),
(2), (4) Date: Aug. 16, 2013

(87) PCT Pub. No.: WO2012/114775
PCT Pub. Date: Aug. 30, 2012

(65) Prior Publication Data
US 2013/0323486 A1   Dec. 5, 2013

(30) Foreign Application Priority Data

Feb. 25, 2011  (JP) ................................ 2011-040562
Feb. 25, 2011  (JP) ................................ 2011-040740

(51) Int. Cl.
*B29D 30/56* (2006.01)
*B29D 30/54* (2006.01)
(Continued)

(52) U.S. Cl.
CPC ............. *B29D 30/54* (2013.01); *B29D 30/06* (2013.01); *B29D 30/56* (2013.01); *B60C 11/005* (2013.01);
(Continued)

(58) Field of Classification Search
CPC ......... B29D 30/54; B29D 30/56; B60C 11/02; B60C 2011/0025; B60C 11/0041
See application file for complete search history.

(56) References Cited

U.S. PATENT DOCUMENTS

| 4,517,146 A | 5/1985 | Takasu et al. |
| 5,536,348 A * | 7/1996 | Chlebina .............. B29D 30/542 |
| | | 152/209.6 |

(Continued)

FOREIGN PATENT DOCUMENTS

| GB | 1389568 A * | 4/1975 |
| JP | 59-62131 A | 4/1984 |

(Continued)

OTHER PUBLICATIONS

Machine translation for Japan 2008-120044 (no date).*
(Continued)

*Primary Examiner* — Steven D Maki
(74) *Attorney, Agent, or Firm* — Sughrue Mion, PLLC

(57) ABSTRACT

Provided are a tire having a small difference in a loss tangent (tan δ) at a tire tread outer surface position and that at a middle position, a tread for a retread tire having an even vulcanization degree in a whole tread rubber area, a tire having the tread for the retread tire, and a method for manufacturing the tire. The tire satisfies the following formula:

$$-0.05 \leq (\tan \delta_a - \tan \delta_b)/\tan \delta_b \leq 0.05,$$

where ($\tan \delta_a$) represents a loss tangent of strain at 2% at 25° C. in a portion (a) within 1 mm deep from a tire tread outer surface in a direction perpendicular to a tread surface, and ($\tan \delta_b$) represents a loss tangent of strain at 2% at 25° C. in a portion (b) within 2 mm from
(Continued)

a median center between a tread portion outer surface and a bottom surface in the direction perpendicular to the tread surface.

3 Claims, 1 Drawing Sheet

(51) Int. Cl.
    *B60C 11/00* (2006.01)
    *B60C 11/02* (2006.01)
    *B29D 30/06* (2006.01)

(52) U.S. Cl.
    CPC ...... *B60C 11/02* (2013.01); *B29D 2030/0677* (2013.01); *B60C 2011/0025* (2013.01); *Y10T 428/24942* (2015.01)

(56) References Cited

U.S. PATENT DOCUMENTS

| | | | | |
|---|---|---|---|---|
| 5,769,975 A | * | 6/1998 | Keys | B29C 33/3828 152/209.6 |
| 2007/0231423 A1 | * | 10/2007 | Han | B29C 33/06 425/549 |
| 2009/0159165 A1 | * | 6/2009 | Herberger, Sr. | B29D 30/56 152/209.1 |

FOREIGN PATENT DOCUMENTS

| | | | | |
|---|---|---|---|---|
| JP | 61-84211 A | | | 4/1986 |
| JP | 3-193312 A | | | 8/1991 |
| JP | 4-173211 A | | | 6/1992 |
| JP | 09-070903 A | * | | 3/1997 |
| JP | 9-70903 A | | | 3/1997 |
| JP | 10-129216 A | | | 5/1998 |
| JP | 2003-146013 A | | | 5/2003 |
| JP | 2004-34409 A | | | 2/2004 |
| JP | 2005-271534 A | * | | 10/2005 |
| JP | 2005-271534 A | | | 10/2005 |
| JP | 2008-120044 A | * | | 5/2008 |
| JP | 2008-155567 A | | | 7/2008 |
| JP | 2009-51481 A | | | 3/2009 |
| WO | 2007/037778 A2 | | | 4/2007 |

OTHER PUBLICATIONS

Machine translation for Japan 2005-271534 (no date).*
Machine translation for Japan 09-070903 (no date).*
Partial translation of Japan 2005-271534 (Year: 2017).*
Machine translation for Japan 2005-271534 (Year: 2017).*
Japanese Office Action for JP 2011-040562 A dated Feb. 26, 2013.
Japanese Office Action for JP 2011-040740 dated Feb. 26, 2013.
Japanese Office Action for JP 2011-040740 dated Jul. 2, 2013.
International Search Report for PCT/JP2012/001307 dated May 22, 2012.
Decision of Refusal dated Oct. 8, 2013 in corresponding Japanese Patent Application No. 2011-040740.
Communication dated Apr. 29, 2015 from the State Intellectual Property Office of the P.R.C. in counterpart application No. 201280010398.6.

* cited by examiner

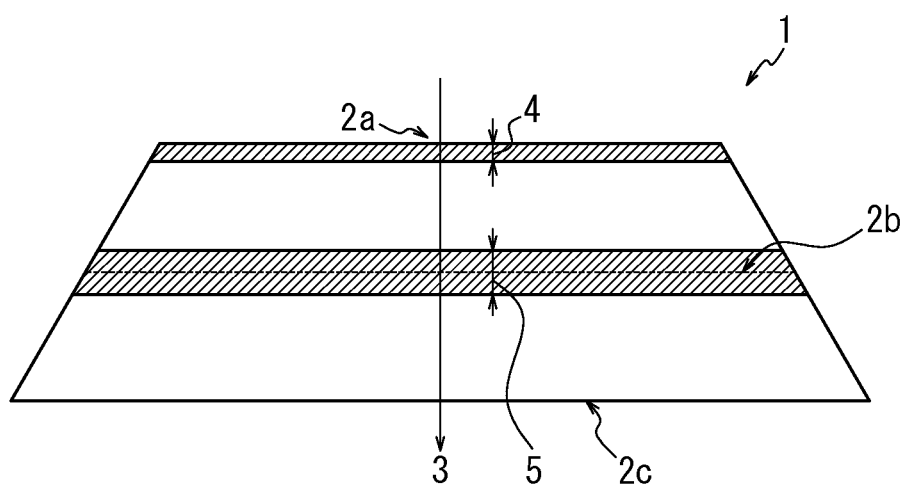

ns, a tread for a retread tire, a
TIRE, TREAD FOR RETREAD TIRE, METHOD FOR MANUFACTURING THE TREAD FOR RETREAD TIRE, RETREAD TIRE HAVING THE TREAD FOR RETREAD TIRE, AND METHOD FOR MANUFACTURING THE RETREAD TIRE

CROSS REFERENCE TO RELATED APPLICATIONS

This application is a National Stage of International Application No. PCT/JP2012/001307 filed Feb. 24, 2012, claiming priority based on Japanese Patent Application Nos. 2011-040740 filed Feb. 25, 2011 and 2011-040562 filed Feb. 25, 2011, the contents of all of which are incorporated herein by reference in their entirety.

TECHNICAL FIELD

The present invention relates to a tire, a tread for a retread tire (precure tread (tread which is vulcanized in advance), a method for manufacturing the tread for the retread tire, a retread tire having the tread for the retread tire, and a method for manufacturing the retread tire.

BACKGROUND ART

Considering fuel efficiency of an automobile and the like using tires, low rolling resistance of the tires is desirable and, in order to reduce the rolling resistance, low hysteresis loss (tan δ) of tread rubber of the tires is desirable.

In general, hysteresis loss of tread rubber has a tendency to be low on an inner side and becomes higher as it approaches a surface. Such a tendency has been one of factors that rolling resistance of a new tire (at the time of initial use) increases.

Although there is a known technique to reduce the tendency by lowering vulcanization temperature, the technique has problems such as generating a difference in the rolling resistance in a thickness direction and having a great impact on production efficiency.

Further, in order to deal with a great difference in a vulcanization temperature rising rate between the surface and the inner side during vulcanization, there is disclosed a technology of manufacturing equipment that, by using a dedicated manufacturing equipment that produces unvulcanized rubber having a structure in which rubber is sequentially distributed according to a vulcanization temperature rising distribution; that is, having slow-vulcanized rubber arranged near the surface where temperature rises quickly and fast-vulcanized rubber arranged the inner side where temperature rises slowly, according to a speed of the rubber to be vulcanized, substantially equalizes a final vulcanization degree in the whole tread (for example, see Patent Document 1).

As a technique for a tread for a retread tire (precure tread) having a low heat generation effect, for example, Patent Document 2 discloses a technique to make base rubber of a two-layer structure tread low-heat-generating and highly elongated, and Patent Document 3 discloses a technique to use, as bonding cushion rubber for the tread for the retread tire (precure tread), rubber with lower heat generating property than that of rubber used for the tread for the retread tire (precure tread).

RELATED ART DOCUMENTS

Patent Documents

Patent Document 1: Japanese Patent Laid-Open No. 4-173211
Patent Document 2: Japanese Patent Laid-Open No. 2009-51481
Patent Document 3: Japanese Patent Laid-Open No. 10-129216

SUMMARY OF INVENTION

Technical Problem

However, the technique of Patent Document 1 has production problems such as requiring a dedicated apparatus and increasing a type of rubber to be used, and thus is not a satisfactory achievement.

Also, in a conventional technique described in Patent Document 1, a rate of a vulcanization degree at an outer surface and an inner side (corresponding to A/B of the present application) is 6.2 to 4.9 and therefore determined that the outer surface is slightly over vulcanized. An improved technique of Patent Document 1 achieved significant reduction in the rate of the vulcanization degree (A/B) to 2.4 and a substantially uniform vulcanization degree, and therefore evaluated as corresponding to an improvement of a tire performance (heat-generation resistance and abrasion resistance) by 5 to 10%. However, there has been a problem that, in terms of social demands of energy conservation and improvement in fuel efficiency in recent years, a further improvement is desired.

Although the technique disclosed in Patent Document 2 certainly enables obtainment of the tread for the retread tire with low heat generation effect (precure tread), there is no description or suggestion about whether the vulcanization degree is uniform at the surface of the tread for the retread tire (precure tread) and the inner side. Also, since this technique requires the two-layer structure by using base rubber having low heat resistance, there have been production problems such as requiring a process to bond to cap rubber and limiting rubber compounding and a precuring step.

Further, since the conventional technique described in Patent Document 3 simply uses adhesive cushion rubber having lower heat-generation property than the rubber used for the tread for the retread tire (precure tread), only insufficient contribution is made to reduction in tire running temperature. Also, there is no description or suggestion about uniformity of the vulcanization degree at the surface of the tread for the retread tire (precure tread) and the inner side. Moreover, there is a problem that, when the cushion rubber is made to have the low heat-generation property, rubber compounding thereof is limited. Further, there is a problem that a further improvement of the low heat-generation property is desired in terms of social demands of energy conservation and fuel efficiency in recent years.

As such, an object of the present invention is to solve the problems of the conventional techniques described above and to provide, in relation to a tire having a small difference in loss tangent (tan δ) between a tire tread outer surface and a tire tread middle position, a tread for a retread tire having a uniform vulcanization degree in all areas of tread rubber, a tire having the tread for the retread tire, and a method for manufacturing the tire, without sacrificing productivity in particular, a tire having an improved difference in hysteresis loss at the outer surface and that in the center at the time of initial use and also having reduced rolling resistance at the time of initial use, a tread for a retread tire, a tire having the tread for the retread tire, and a method for manufacturing the tire.

Solution to Problem

The present inventor has found that, by controlling vulcanization conditions, a vulcanization degree at an outer surface of a tire tread may become uniform with that at a center portion of the tire tread and also, without sacrificing productivity, tire rolling resistance may be reduced from the time of initial use. Thus, the present inventor has accomplished the present invention.

The present inventor has also found that carrying out vulcanization having a non-vulcanizable sheet placed between a vulcanizing press apparatus and an unvulcanized tread prevents over-vulcanization of a surface of a tire tread and enables uniform vulcanization to an inner portion of the tire tread.

That is, according to a tire of the present invention, loss tangent (tan $\delta_a$) of strain at 2% at 25° C. at a position (a) within 1 mm deep from a tire tread outer surface in a direction perpendicular to the tread surface (wheel tread) and loss tangent (tan $\delta_b$) of strain at 2% at 25° C. at a position (b) within 2 mm from a median center between a tread portion outer surface and a bottom surface in the direction perpendicular to the tread surface satisfy the following relationship:

$$-0.05 \leq (\tan \delta_a - \tan \delta_b)/\tan \delta_b \leq 0.05$$

According to a tread for a retread tire of the present invention, a vulcanization degree (A) at the position (a) within 1 mm deep from the tire tread outer surface in the direction perpendicular to the tread surface and a vulcanization degree (B) at the position (b) within 2 mm from the median center between the tread portion outer surface and the bottom surface in the direction perpendicular to the tread surface preferably satisfy the following relationship:

$$0.8 \leq A/B \leq 1.4$$

and, more preferably, the vulcanization degree (A) and the vulcanization degree (B) satisfy the following relationship:

$$0.9 \leq A/B \leq 1.2$$

According to the tread for the retread tire in the tire of the present invention, or a method for manufacturing a tread for a retread tire to manufacture the tread for the retread tire of the present invention, it is preferable to carry out vulcanization such that, where T represents a time from start of vulcanization to a time when temperature reaches 99.5% of maximum vulcanization temperature, after T/4 minutes, a vulcanization degree ($A_{T/4}$) at the position (a) within 1 mm deep from the tire tread outer surface in the direction perpendicular to the tread surface and a vulcanization degree ($B_{T/4}$) at the position (b) within 2 mm from the median center between the tread portion outer surface and the bottom surface in the direction perpendicular to the tread surface satisfy the following relationship:

$$0 \leq A_{T/4} \leq 0.13, 0 \leq B_{T/4} \leq 0.05, \text{ and also,}$$

after T/2 minutes, a vulcanization degree ($A_{T/2}$) at the position (a) within 1 mm deep from the tire tread outer surface in the direction perpendicular to the tread surface and a vulcanization degree ($B_{T/2}$) at the position (b) within 2 mm from the median center between the tread portion outer surface and the bottom surface in the direction perpendicular to the tread surface satisfy the following relationship:

$$0.1 \leq A_{T/2} \leq 0.29, 0.05 \leq B_{T/2} \leq 0.2.$$

According to the tread for the retread tire in the tire of the present invention, or the method for manufacturing the tread for the retread tire to manufacture the tread for the retread tire of the present invention, during vulcanization of the unvulcanized tread by a vulcanization press apparatus, it is preferable to place a non-vulcanizable sheet between the vulcanization press apparatus and the unvulcanized tread.

Thereby, without sacrificing productivity, a method for manufacturing a tread for a retread tire (precure tread) having a small difference in hysteresis loss (tan $\delta$) in the direction perpendicular to the tread surface of the tread for the retread tire (precure tread) and also having all areas that are uniformly vulcanized may be provided.

Preferably, the non-vulcanizable sheet has a thickness of 0.05 to 3.5 mm and thermal conductivity at 0.02 to 30 $W \cdot m^{-1} \cdot K^{-1}$. More preferably, the non-vulcanizable sheet has a melting point at 130° C. or higher and is made of a material that does not cause a crosslinking reaction at least at an outermost surface.

The tread for the retread tire according to the present invention is preferably manufactured by the method described above.

A retread tire of the present invention is preferably composed of any one of the aforementioned treads for the retread tire. Also, a method for manufacturing the tire of the present invention preferably includes a step of carrying out vulcanization bonding of one of the aforementioned treads for the retread tire and a base tire at 80° C. or higher.

Effect of the Invention

According to the present invention, in relation to the tire having a small difference in loss tangent (tan $\delta$) between the tire tread outer surface and the median center between the outer surface and the bottom surface, the tread for the retread tire having uniform vulcanization degree in all areas of tread rubber, the retread tire having the tread for the retread tire, and the method for manufacturing the retread tire, without sacrificing productivity in particular, the tire having improved difference between hysteresis loss on the outer surface and that in the center portion at the time of initial use and also having reduced rolling resistance at the time of initial use, the tread for the retread tire, the tire having the tread for the retread tire, and the method for manufacturing the tire may be provided.

BRIEF DESCRIPTION OF DRAWING

FIG. 1 is a cross-sectional view illustrating an example of a tread used for a tire according to the present invention.

DESCRIPTION OF EMBODIMENTS (Tire)

According to the tire of the present invention, loss tangent (tan $\delta_a$) of strain at 2% at 25° C. at a position (a) within 1 mm deep from a tire tread outer surface in a direction perpendicular to a tread surface and loss tangent (tan $\delta_b$) of strain at 2% at 25° C. at a position (b) within 2 mm from a median center between a tread portion outer surface and a bottom surface in the direction perpendicular to the tread surface need to satisfy the following relationship:

$$-0.05 \leq (\tan \delta_a - \tan \delta_b)/\tan \delta_b \leq 0.05.$$

When $(\tan \delta_a - \tan \delta_b)/\tan \delta_b$ is in a range of ±0.05, a difference in heat generation at the outer surface of tire tread rubber and that on an inner side of the tire tread rubber during running can be sufficiently suppressed and a difference between inner temperature and outer temperature decreases. Thereby, rolling resistance of the tire can be reduced from the time of initial use. When $(\tan \delta_a - \tan \delta_b)/\tan \delta_b$ is out of the range of ±0.05, the effect of suppressing the difference in the heat generation at the outer surface of the tire tread rubber that directly contacts the ground and that on the inner side of the tire tread rubber becomes insufficient and the temperature becomes significantly different between inside and outside due to the heat generated during running. Therefore, the rolling resistance of the tire may possibly be deteriorated at the time of initial use in particular.

(Tire Tread)

A tread for a retread tire (precure tread) manufactured by the method of the present invention is preferably used as a tire tread for a retread tire produced by a precure method. Here, the precure method is a method for manufacturing a retread tire by bonding a vulcanized precure tread for retreading having a tread pattern to a base tire and carrying out vulcanizing adhesion by using a vulcanizing can.

The following describes a tire tread 1 used for the tire of the present invention, with reference to a cross-sectional view illustrated in FIG. 1. A portion on top of a carcass portion (tire framework portion) of the tire having a groove pattern, which is called a pattern, is referred to as a tread portion. A tire member used for the tread portion is referred to as a tire tread, for which a precure tread 1 is preferably used. When the tire tread (precure tread) 1 is divided into an outer surface 2a, a center 2b and a bottom surface 2c, the outer surface 2a of the tire tread is a surface to directly contact with the ground (wheel tread), whose hysteresis loss (tan δ) has the greatest impact on rolling resistance and fuel efficiency of a vehicle. Also, the outer surface 2a is an important part of the tire tread 1 because, when a difference between the hysteresis loss of the outer surface 2a and that of the center 2b is large, the rolling resistance and the fuel efficiency of the vehicle may possibly be deteriorated especially at the time of initial use of the tire (when the tire is new). The outer surface 2a, the center 2b and the bottom surface 2c are integrally positioned on top of the carcass portion (tire framework portion) of the tire.

Preferable positions for evaluation of uniformity of the hysteresis loss (tan δ) in relation to a depth in a thickness direction of the tire tread 1 are a portion (a) 4 that is in a range of 1 mm deep from the outer surface 2a in a direction 3 perpendicular to the tread surface and a portion (b) 5 that is in a range of 2 mm from the center 2b of the tread portion in the direction 3 perpendicular to the tread surface. This is because these positions facilitate determination on measurement positions and represent uniformity (variation) in a whole tire tread, thus enabling an accurate evaluation.

(Method for Manufacturing Tire)

A method for manufacturing the tire is roughly classified into a method for manufacturing a new tire and a method for manufacturing a retread tire. In the method for manufacturing a new tire, unvulcanized tread rubber having no tread pattern is bonded to a tread portion of a base tire and then integral vulcanization molding is carried out in a mold. The method for manufacturing the retread tire is further classified into (i) a remolding method to bond a vulcanized tread rubber for retreading having no tread pattern to the tread portion of the base tire and to carry out vulcanization molding in the mold, and (ii) a procuring method to arrange adhesive cushion rubber composed of unvulcanized rubber on the tread portion of the base tire and then to bond a vulcanized tread for retreading (precure tread) having a tread pattern to the base tire, followed by vulcanization bonding by using the vulcanization can.

The method for manufacturing the tire of the present invention is characterized by control of vulcanization conditions. According to the method for manufacturing the tread for the retread tire (precure tread), heat conduction is controlled appropriately by using a non-vulcanizable sheet at the time of vulcanization. A technique associated with rubber composition (such as raw materials of rubber component and fillers and composition thereof) is not particularly limited.

For example, a technique that may reduce the hysteresis loss (tan δ) by increasing an amount of sulfur in the rubber composition used for the tire tread or by reducing an amount of the filler may be mentioned. However, the technique is not particularly limited.

Also, a technique that, as illustrated in Patent Document 1, provides a multilayer structure using slow-vulcanized rubber at the outer surface of the tire tread and fast-vulcanized rubber on the inner side of the tire tread such that the hysteresis loss (tan δ) at the surface of the tire tread and that on the inner side is homogenized may be mentioned. However, the technique is not particularly limited.

Further, rubber component of the rubber composition used for the tire tread may be, but not limited to, in addition to natural rubber (NR), synthetic rubber such as polybutadiene rubber (BR), polyisoprene rubber (IR), styrene-butadiene copolymer rubber (SBR) and the like. The rubber component may be used alone or blended with another. When blending, it is preferable to blend natural rubber (NR) and polybutadiene rubber (BR), and a blending ratio NR/BR is preferably in a range of 80/20 to 60/40.

The filler for the rubber composition may be, but not limited to, carbon black and silica. Here, carbon black of SAF grade or carbon black of ISAF grade is preferable. When using silica as the filler, in terms of further improvement in a reinforcing property thereof, it is preferable to add a silane coupling agent at the time of blending.

In the rubber composition, in addition to the rubber component and the fillers described above, compounding agents usually used for the tire tread in a rubber industry, namely, a vulcanizing agent, a vulcanization accelerator, antioxidant, and softener such as process oil may be blended within a range of normal amount used for the tread. As those compounding agents, commercially available ones may be appropriately used.

(Vulcanization Condition)

As a vulcanization condition, any apparatus may be used, as long as capable of heating and/or keeping a target at temperature of 100° C. or higher and, simultaneously, holding a sample at a pressure of 0.1 MPa or more.

(Bonding Process, Vulcanization Bonding Process)

A process to bond the tread preferably includes, but not particularly limited to, a step of carrying out vulcanization bonding of the tread and the base tire at temperature of 80° C. or higher.

At temperature 80° C. or below, when typical vulcanization bonding rubber is used, a vulcanization time is elongated, which is undesirable.

(Tread for Retread Tire.)

According to the tread for the retread tire of the present invention, a vulcanization degree (A) at the position (a)

within 1 mm deep from the tire tread outer surface in the direction perpendicular to the tread surface and a vulcanization degree (B) at the position (b) within 2 mm from the median center between the tread portion outer surface and the bottom surface in the direction perpendicular to the tread surface preferably satisfy the following relationship:

$$0.8 \leq A/B \leq 1.4$$

and, more preferably, the vulcanization degree (A) and the vulcanization degree (B) satisfy the following relationship:

$$0.9 \leq A/B \leq 1.2.$$

When the ratio of a vulcanization degree (A/B) is below 0.8, the rolling resistance increases at the time of late use, and when the ratio exceeds 1.4, the rolling resistance increases at the time of initial use.

(Manufacture of Tread for Retread Tire (Precure Tread))

According to a method for manufacturing a tread for a retread tire of the present invention, it is preferable to carry out vulcanization such that, where T represents a time from start of vulcanization to a time when temperature reaches 99.5% of maximum vulcanization temperature, after T/4 minutes, a vulcanization degree ($A_{T/4}$) at the position (a) within 1 mm deep from the tire tread outer surface in the direction perpendicular to the tread surface and a vulcanization degree ($B_{T/4}$) at the position (b) within 2 mm from the median center between the tread portion outer surface and the bottom surface in the direction perpendicular to the tread surface satisfy the following relationship:

$$0 \leq A_{T/4} \leq 0.13, 0 \leq B_{T/4} \leq 0.05, \text{ and also,}$$

after T/2 minutes, a vulcanization degree ($A_{T/2}$) at the position (a) within 1 mm deep from the tire tread outer surface in the direction perpendicular to the tread surface and a vulcanization degree ($B_{T/2}$) at the position (b) within 2 mm from the median center between the tread portion outer surface and the bottom surface in the direction perpendicular to the tread surface satisfy the following relationship:

$$0.1 \leq A_{T/2} \leq 0.29, 0.05 \leq B_{T/2} \leq 0.2.$$

Further, according to the method of manufacturing the tread for the retread tire (precure tread) of the present invention, when the unvulcanized tread is vulcanized by a vulcanizing press apparatus, the non-vulcanizable sheet is preferably placed between the vulcanizing press apparatus and the unvulcanized tread during vulcanization.

—Unvulcanized Tread—

The unvulcanized tread may be prepared by, but not particularly limited to, kneading and molding the rubber composition mentioned above.

—Vulcanizing Press Equipment—

The vulcanizing press machine is not particularly limited but may be appropriately selected in accordance with the intended use.

—Non-Vulcanizable Sheet—

According to the method of producing the precure tread of the present invention, when the unvulcanized tread is vulcanized by the vulcanizing press apparatus, the non-vulcanizable sheet is placed between the vulcanizing press apparatus and the unvulcanized tread. Carrying out vulcanization having the non-vulcanizable sheet placed between the vulcanizing press apparatus and the unvulcanized tread prevents over-vulcanization of the tread surface of the tire and enables uniform vulcanization to the inner side of the tire tread. This is because a structure in which the non-vulcanizable sheet buffers thermal conduction at the time of vulcanization of the precure tread is established.

Material of the sheet may be PET film, paper, nonwoven fabric and the like.

A thickness t of the sheet is preferably 0.05 to 3.5 mm. When the t is over 3.5 mm, a property to follow the mold is deteriorated, thereby a thermal conductivity is varied. When the t is smaller than 0.05 mm, durability is deteriorated and the sheet may not withstand repeated use.

A thermal conductivity λ of the sheet is preferably 0.02 to 30 $W \cdot m^{-1} \cdot K^{-1}$. When the λ exceeds 30 $W \cdot m^{-1} \cdot K^{-1}$, rapid conduction of heat occurs and an effect of the present invention may not be exhibited. When the λ is smaller than 0.02 $W \cdot m^{-1} \cdot K^{-1}$, the vulcanization time is elongated, leading to low productivity.

Preferably, further, the sheet has a melting point at 130° C. or higher and made from material that does not cause a crosslinking reaction at least at an outermost surface. This is because, when the melting point is below 130° C., the sheet is melt and the sheet and a surface of the rubber or the mold may possibly be fused. Also, when the sheet is not made from material that does not cause the crosslinking reaction at the outermost surface, the sheet and the rubber may possibly be co-vulcanized.

(Manufacture of Retread Tire)

The unvulcanized tread for the retread tire is subjected to vulcanization molding in a suitable mold having projections for forming a tread pattern, such that the tread for the retread tire (precure tread) made of vulcanized rubber having the tread pattern is produced. The retread tire may be manufactured using the produced tread for the retread tire, according to the method for manufacturing the retread tire of a conventional precure method, by removing the tread rubber from the new tire or the retread tire, and then bonding the tread for the retread tire illustrated in FIG. 1 onto the base tire formed by buff processing. Or, the retread tire having vulcanized tread for the retread tire on the base tire may be produced using the unvulcanized tread for the retread tire, according to the method for manufacturing the retread tire of a conventional remolding method, by removing the tread rubber from the new tire or the retread tire, bonding the unvulcanized tread for the retread tire onto the base tire formed by the buff processing, and carrying out vulcanization bonding in the mold.

In particular, the retread tire according to present invention is preferably obtained by bonding the tread for the retread tire described above or the tread produced by the method described above. According to the method for manufacturing the retread tire of the present invention, the process for producing the tire preferably includes a step of carrying out vulcanization bonding of the tread and the base tire at temperature of 80° C. or higher.

Although the present invention has been described above using the embodiments, a technical scope of the present invention is not limited thereto. It will be apparent to those who are skilled in the art that various changes or modifications may be made to the above embodiments, and it is appreciated that the embodiments to which such changes or modification are made may be included in the technical scope of the present invention, as is clear from the description in the present claims.

The following is a further detailed description of the present invention by using examples. However, the present invention is not limited to the following examples in any manners.

EXAMPLES

After the tire is obtained by using the precure tread produced by formulation under vulcanization conditions shown in Table 1, changes in the vulcanization degrees (A and B) and hysteresis loss (tan δ) in the thickness direction from the surface were observed. The vulcanization degrees (A and B) and the hysteresis loss (tan δ) were measured as follows. The measurement results are shown in Table 1.

(Vulcanization Degree)

Using Curastometer manufactured by JSR Corporation, a vulcanization torque curve at 145° C.±1° C. in a 90% vulcanization time ($T_{0.9}$) was measured, so as to obtain the 90% vulcanization time ($T_{0.9}$), which is the time required to reach 90% of a maximum value.

A vulcanization degree C. may be obtained by the following formula.

manner, so as to prepare a test piece. Using a viscoelastic spectrometer manufactured by Toyo Seiki Co., Ltd., under the conditions with initial load of 80 g, dynamic strain at 2%, frequency at 50 Hz and temperature at 25° C., tan δ(E″/E′) was measured.

(Rolling Resistance Performance)

A drum test to rotate the tire pressing against the drum was conducted to measure rolling resistance (RR) during tire rotation. Measurement conditions were a speed at 80 km/h, a load of 2725 kg and ambient temperature at 25° C. A tire of control (Comparative Example 2) is expressed by an index 100. The smaller the value is, the rolling resistance is smaller and in better condition.

TABLE 1

|  | Example 1 | Example 2 | Comparative Example 1 | Comparative Example 2 | Comparative Example 3 | Comparative Example 4 |
|---|---|---|---|---|---|---|
| Natural Rubber *1 | 70 | 70 | 70 | 70 | 70 | 70 |
| BR *2 | 30 | 30 | 30 | 30 | 30 | 30 |
| Carbon Black *3 | 47 | 47 | 47 | 47 | 47 | 47 |
| Stearic Acid | 2 | 2 | 2 | 2 | 2 | 2 |
| Antioxidant *4 | 2 | 2 | 2 | 2 | 2 | 2 |
| Vulcanization Accelerator *5 | 1.2 | 1.2 | 1.2 | 1.2 | 1.2 | 1.2 |
| Sulfur | 1.2 | 1.2 | 1.2 | 1.2 | 1.2 | 1.2 |
| Property Value (Vulcanization Degree, Loss Tangent) | | | | | | |
| Ratio of Vulcanization Degree (A/B) | 1.1 | 1.1 | 1.7 | 0.6 | 1.45 | 2.1 |
| Vulcanization Degree ($A_{T/4}$) | 0.05 | 0.05 | 0.07 | 0 | 0.05 | 0.08 |
| Vulcanization Degree ($B_{T/4}$) | 0 | 0.01 | 0.01 | 0.07 | 0.01 | 0.01 |
| Vulcanization Degree ($A_{T/2}$) | 0.1 | 0.12 | 0.3 | 0.09 | 0.2 | 0.29 |
| Vulcanization Degree ($B_{T/2}$) | 0.09 | 0.06 | 0.06 | 0.28 | 0.07 | 0.1 |
| Ratio of Difference of Loss Tangent $(\tan\delta_a - \tan\delta_b)/\tan\delta_b$ | 0.04 | 0.03 | 0.15 | −0.15 | 0.11 | 0.15 |
| Loss Tangent ($\tan\delta_a$) | 0.197 | 0.189 | 0.221 | 0.2 | 0.214 | 0.233 |
| Loss Tangent ($\tan\delta_b$) | 0.19 | 0.184 | 0.193 | 0.235 | 0.192 | 0.202 |
| Tire Performance Evaluation (Index) | | | | | | |
| Rolling Resistance | 99 | 95 | 111 | 100 | 107 | 117 |

A unit of the value of each component in the rubber composition is parts by mass and units of manufacturing conditions are ° C. and minutes. The property value is an each measured property value and a ratio thereof, and each value of the tire performance evaluation is an index.
*1 natural rubber RSS #3
*2 polybutadiene rubber BR01 produced by JSR Corporation
*3 Seast 7HM produced by Tokai Carbon Co., Ltd.
*4 Nocrac 6C produced by Ouchi Shinko Chemical
*5 Nocceler CZ-G produced by Ouchi Shinko Chemical $$C = \frac{\int_0^t T(t)dt}{\int_0^{t_2} T(t)dt}$$ [Formula 1]

Here, t represents a vulcanization time from start of vulcanization, T(t) represents temperature at the time t, and $t_2$ represents an overall vulcanization time from the start of vulcanization to the end.

(Loss Tangent (tan δ))

A sample was removed from a predetermined position of the tire tread by slicing a specimen in a predetermined As shown in Table 1, Examples 1 and 2 had smaller changes in the hysteresis loss at an outer surface portion and a center portion comparing to Comparative Examples 1 to 4, and thus were able to reduce the value of the hysteresis loss.

Also, Examples 1 and 2 had smaller changes in the ratio of the vulcanization degree at the surface portion and the center portion (A/B) comparing to Comparative Examples 1 to 4, thus were able to reduce the value of the ratio of the vulcanization degree. Therefore, changes in the hysteresis loss were small at the surface portion and the center portion, and the values of the hysteresis loss were lowered.

This is because Examples 1 and 2 were able to adopt a producing method to vulcanize such that, when T represents the time from the start of vulcanization to the time when temperature reaches 99.5% of maximum vulcanization temperature, after T/4 minutes, the vulcanization degree ($A_{T/4}$) at the position (a) within 1 mm deep from the tire tread outer surface in the direction perpendicular to the tread surface and the vulcanization degree ($B_{T/4}$) at the position (b) within 2 mm from the median center between the tread portion outer surface and the bottom surface in the direction perpendicular to the tread surface satisfy the following relationship:

$$0 \le A_{T/4} \le 0.13, 0 \le B_{T/4} \le 0.05, \text{ and also,}$$

after T/2 minutes, the vulcanization degree ($A_{T/2}$) at the position (a) within 1 mm deep from the tire tread outer surface in the direction perpendicular to the tread surface and the vulcanization degree ($B_{T/2}$) at the position (b) within 2 mm from the median center between the tread portion outer surface and the bottom surface in the direction perpendicular to the tread surface satisfy the following relationship:

$$0.1 \le A_{T/2} \le 0.29, 0.05 \le B_{T/2} \le 0.2.$$

Therefore, the changes in the ratio of the vulcanization degree (A/B) at the surface portion and the center portion were smaller than Comparative Examples 1 and 2 (Comparative Examples 1 to 4), reducing the value of the ratio of the vulcanization degree. Accordingly, changes in the hysteresis loss were small at the surface portion and the center portion, and the values of the hysteresis loss were lowered.

REFERENCE SIGNS LIST

1 tire tread (precure tread)
2a outer surface of tire tread
2b center of tire tread
2c bottom surface of tire tread
3 direction perpendicular to tread surface
4 portion (a)
5 portion (b)

The invention claimed is:

1. A method for manufacturing a tread for a retread tire comprising a tread portion having an outer surface and a bottom surface, wherein a vulcanization degree (A) at the position (a) within 1 mm deep from the tread portion outer surface in the direction perpendicular to the tread surface and a vulcanization degree (B) at the position (b) within 2 mm from the median center between the tread portion outer surface and the tread portion bottom surface in the direction perpendicular to the tread surface satisfy the following relationship:

$$1.1 \le A/B \le 1.2$$

comprising vulcanization of an unvulcanized tread for manufacturing the tread portion, wherein, where T represents a time from start of vulcanization to a time when temperature reaches 99.5% of maximum vulcanization temperature, after T/4 minutes, a vulcanization degree ($A_{T/4}$) at a position (a) within 1 mm deep from the tread portion outer surface in the direction perpendicular to a tread surface and a vulcanization degree ($B_{T/4}$) at a position (b) within 2 mm from a median center between the tread portion outer surface and the bottom surface in a direction perpendicular to the tread surface satisfy the following relationship:

$$0 \le A_{T/4} \le 0.13, 0 \le B_{T/4} \le 0.05, \text{ and also,}$$

after T/2 minutes, a vulcanization degree ($A_{T/2}$) at the position (a) within 1 mm deep from the tread portion outer surface in the direction perpendicular to the tread surface and a vulcanization degree ($B_{T/2}$) at the position (b) within 2 mm from the median center between the tread portion outer surface and the tread portion bottom surface in the direction perpendicular to the tread surface satisfy the following relationship:

$$0.1 \le A_{T/2} \le 0.29, 0.05 \le B_{T/2} \le 0.2,$$

the vulcanization comprising vulcanization of an unvulcanized tread using a vulcanization press apparatus, and a non-vulcanizable sheet being placed between the vulcanization press apparatus and the unvulcanized tread, and the non-vulcanizable sheet has a thickness of 0.05 to 3.5 mm and thermal conductivity at 0.02 to 30 W·m$^{-1}$·K$^{-1}$, and the non-vulcanizable sheet is paper or nonwoven fabric.

2. The method according to claim 1, wherein the non-vulcanizable sheet has a melting point at 130° C. or higher and is made of a material that does not cause a crosslinking reaction at least at an outermost surface of a non-vulcanizable surface.

3. A method for manufacturing a retread tire including a step of carrying out vulcanization bonding of the tread manufactured according to claim 1 and a base tire at 80° C. or higher.

* * * * *